US005871100A

United States Patent [19]
Ward

[11] Patent Number: 5,871,100
[45] Date of Patent: *Feb. 16, 1999

[54] SECURITY BATTERY PACKAGE

[75] Inventor: Thomas F. Ward, Madison, Wis.

[73] Assignee: Rayovac Corporation, Madison, Wis.

[ * ] Notice: The portion of the term of this patent subsequent to Dec. 22, 2015, has been disclaimed.

[21] Appl. No.: 773,216

[22] Filed: Dec. 23, 1996

Related U.S. Application Data

[63] Continuation-in-part of Ser. No. 577,504, Dec. 22, 1995, Pat. No. 5,586,657.

[51] Int. Cl.$^6$ ..................................................... B65D 85/88
[52] U.S. Cl. ........................ 206/705; 206/459.1; 206/807; 340/572
[58] Field of Search ..................................... 206/703, 701, 206/705, 459.1, 459.5, 461, 462, 463, 467, 470, 471, 807; 340/571, 572

[56] References Cited

U.S. PATENT DOCUMENTS

| 1,837,012 | 12/1931 | Boeye | 206/705 |
|---|---|---|---|
| 2,081,656 | 5/1937 | Anthony . | |
| 2,385,400 | 9/1945 | Briggs . | |
| 3,276,574 | 10/1966 | Meyers . | |
| 3,480,138 | 11/1969 | Baker . | |
| 3,985,232 | 10/1976 | Johnson . | |
| 3,990,578 | 11/1976 | Roeser . | |
| 4,355,758 | 10/1982 | Lavery . | |
| 4,688,026 | 8/1987 | Scribner et al. . | |
| 4,696,402 | 9/1987 | Harmon et al. | 206/703 |
| 4,745,401 | 5/1988 | Montean . | |
| 4,769,631 | 9/1988 | Copeland . | |
| 4,848,568 | 7/1989 | Eckelman | 206/705 |
| 5,005,125 | 4/1991 | Farrar et al. . | |
| 5,143,215 | 9/1992 | Hartley et al. . | |
| 5,379,894 | 1/1995 | Haas et al. | 206/705 |
| 5,586,657 | 12/1996 | Ward et al. | 206/705 |
| 5,590,787 | 1/1997 | Hodges | 206/701 |
| 5,617,812 | 4/1997 | Balderson et al. | 206/807 |

FOREIGN PATENT DOCUMENTS

| 541928 A1 | 5/1993 | European Pat. Off. . |
|---|---|---|
| 9203119.6 | 8/1992 | Germany . |

OTHER PUBLICATIONS

Varta Battery Package, identified as "Exhibit E".

Primary Examiner—Paul T. Sewell
Assistant Examiner—Luan K. Bui
Attorney, Agent, or Firm—Lathrop & Clark

[57] ABSTRACT

Batteries are displayed for consumer purchase in a package which provides a means for spacing an electronic article surveillance sensor from the batteries contained within the package. By spacing the sensor away from the metal case of the batteries the interference typically caused by metal in close proximately to an electronic article surveillance sensor is eliminated. Two ways of accomplishing the spacing of the sensor from the batteries are disclosed. The first is a strip of cardboard placed between the surveillance sensor mounted on the side of the box and the batteries. The second is a specially designed box which has a box panel which divides the box into two compartments: one to hold the batteries and a second which creates a space between the batteries and the side of the box on which a surveillance sensor is mounted.

11 Claims, 5 Drawing Sheets

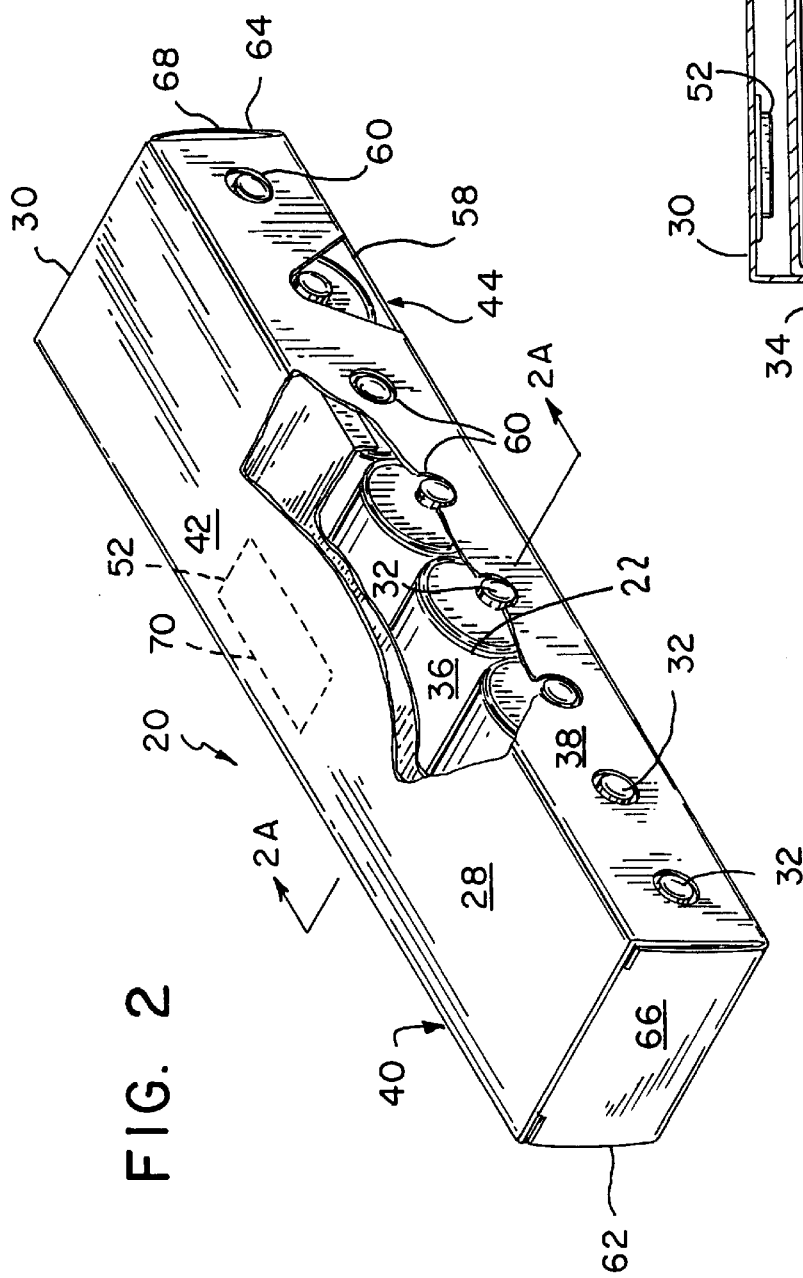
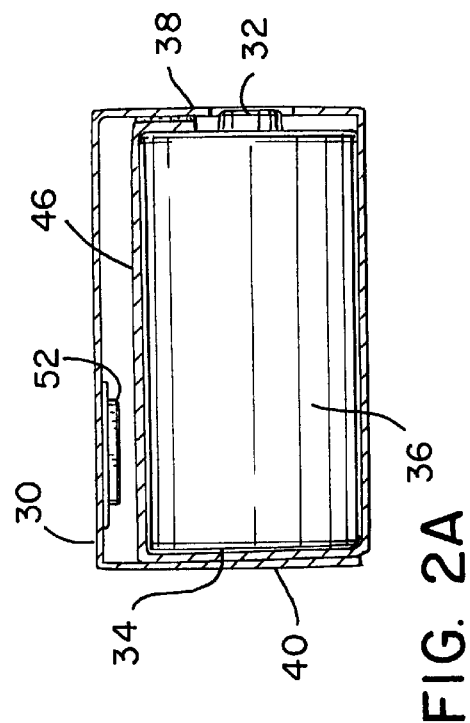
FIG. 2
FIG. 2A

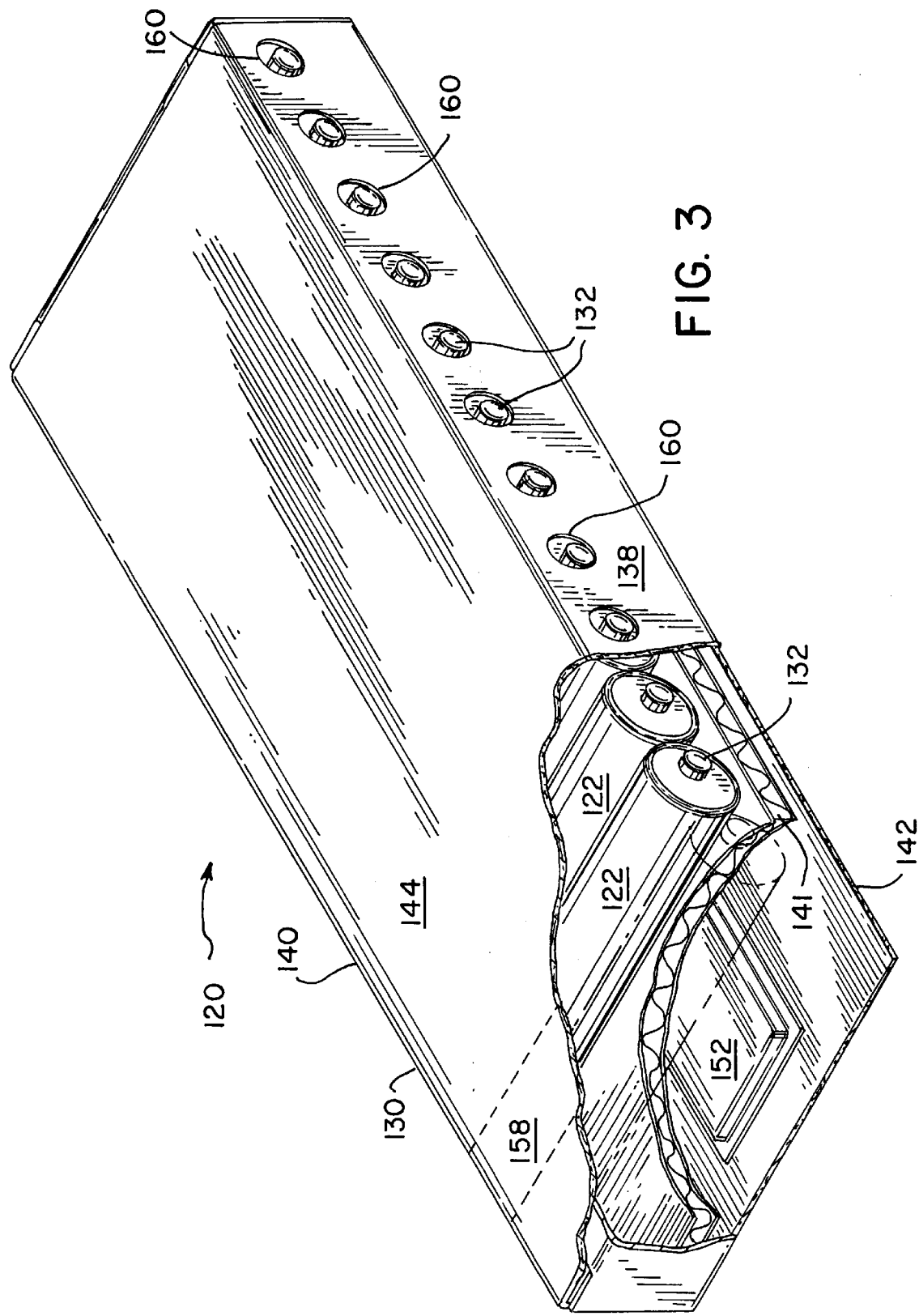

SECURITY BATTERY PACKAGE

RELATED APPLICATIONS

This application is a continuation-in-part of application Ser. No. 08/577,504, filed Dec. 22, 1995, now U.S. Pat. No. 5,586,657.

FIELD OF THE INVENTION

The present invention relates to battery packaging in general and to battery packaging incorporating electronic article surveillance systems in particular.

BACKGROUND OF THE INVENTION

Crimes related to retail establishments represent a serious source of loss to retailers. Although a tremendous number of shoplifters are apprehended each year, it is believed that reported occurrences of shoplifting are dwarfed by the number of undetected or unreported shoplifting events occurring each year in the United States. The cost of shoplifting is not only a significant cost for retailers, but is ultimately borne by the consumer.

Arrayed against the growth in theft is technology which has provided solutions which increase the cost or risk to the criminal perpetrators by making the perpetration of their crimes more readily detectable.

One approach to detecting shoplifting is to place an electronic article surveillance sensor which is hidden or difficult to remove on each item of merchandise. The sensors are detected at the exits of a store and assure that merchandise cannot be removed unless the merchandise is first purchased. Examples of some of the sensors which have been developed are found in U.S. Pat. Nos. 5,357,240; 5,313,192; 5,111,186; 4,510,489; and 4,510,490. For patents to related technology see U.S. Pat. Nos. 5,341,125; 5,109,217; and 4,980,670.

While it is generally desirable that the prospective thief be aware of the fact that a particular store is protected by an electronic article surveillance system, it is also desirable that the potential thief not be able to readily remove the sensor from the merchandise. In some applications this is accomplished by placing a lock on the merchandise which cannot be removed without a special key. For other types of merchandise, it is desirable that the sensor be of the disposable type which is integrally packaged with the goods. In this type of sensor it is usually desirable to hide the sensor so its location and even existence within a particular product is not readily apparent to the potential thief.

In order to cost-justify itself, the electronic surveillance sensor must be cost effectively incorporated in the packaging so the cost of preventing theft does not exceed the cost incurred by theft. Thus, as in the production of all consumer items, cost efficient manufacture is a critical objective.

With batteries there is a problems with placing the sensor in the package. If placed too close to the batteries the sensor may not be detectable. The weight of the batteries can also crush the sensor if the package is dropped in shipping.

What is needed is a battery package which hides an electronic surveillance sensor in the package while preserving functionality.

SUMMARY OF THE INVENTION

The battery package of this invention is a consumer display package which provides a means for spacing an electronic article surveillance sensor from the batteries contained within the package. By spacing the sensor away from the metal case of the batteries the interference typically caused by metal in close proximately to an electronic article surveillance sensor is eliminated. Several ways of accomplishing the spacing of the sensor from the batteries are disclosed. The first means for spacing is a strip of corrugated paperboard or "cardboard" placed between the batteries and one side of the battery package. The surveillance sensor is placed on the inside of the box and the cardboard is inserted between the sensor and the batteries. An alternative means for spacing a surveillance sensor is a specially designed box which has a box panel which divides the box into two compartments—one to hold the batteries and a second which creates a space between the batteries and a side of the box on which a surveillance sensor is mounted.

It is an object of the present invention to provide a package for batteries suitable for mounting a hidden surveillance sensor within the package.

It is a further object of the present invention to provide a package which improves the functionality of an electronic article surveillance sensor.

Further objects, features and advantages of the invention will be apparent from the following detailed description when taken in conjunction with the accompanying drawings.

BRIEF DESCRIPTION OF THE DRAWINGS

FIG. 2 is a partially cutaway isometric view of the assembled battery package of FIG. 1.

FIG. 2A is a cross-sectional view of the battery package of FIG. 2 taken along section line 2A—2A.

FIG. 3 is a partially cutaway isometric view of an alternative embodiment of the battery package of this invention.

DESCRIPTION OF THE PREFERRED EMBODIMENT

Figure 1:
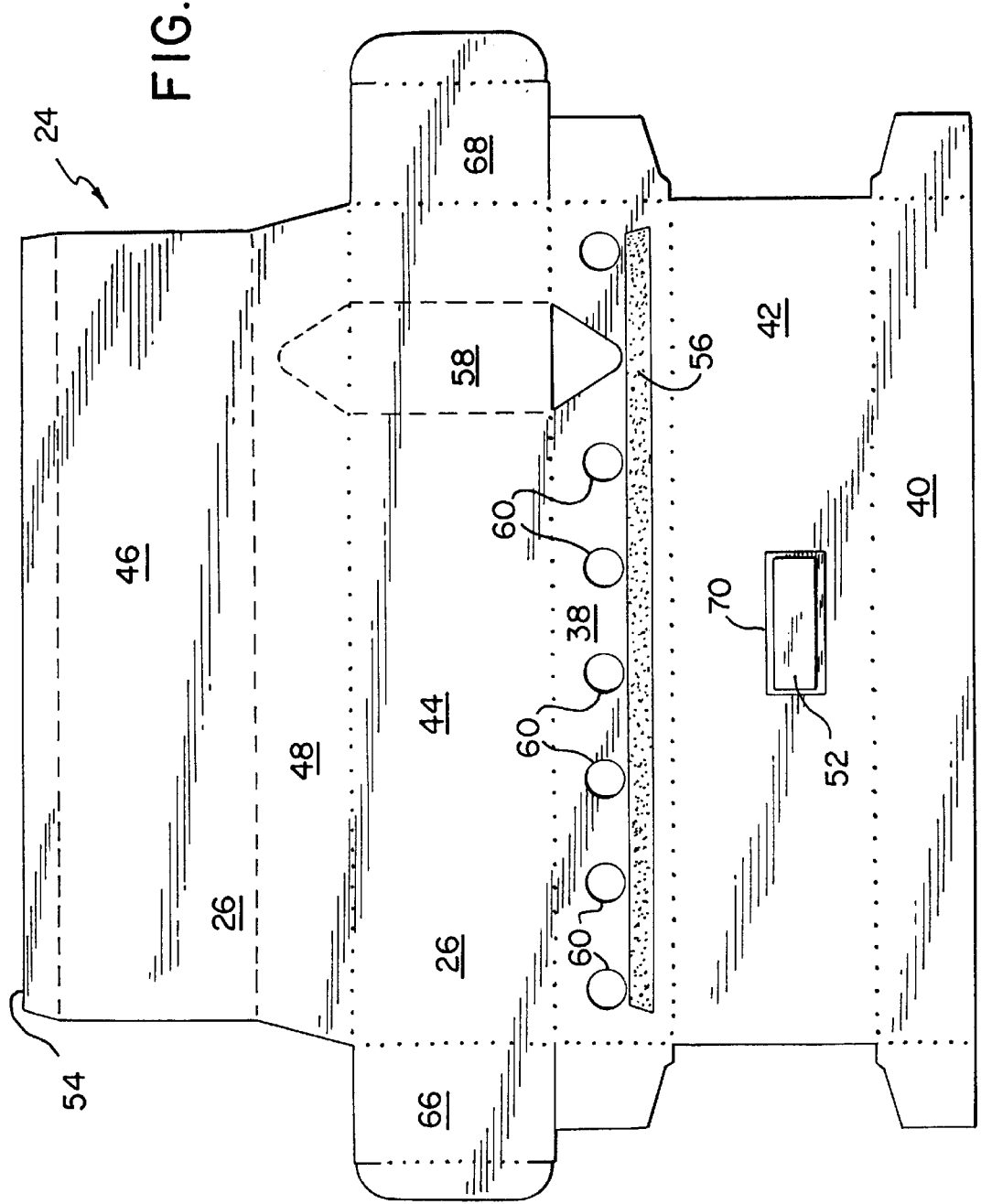
FIG. 1 is a plan view of the blank from which the package of this invention is made.

Referring to FIGS. 1—4, wherein like numbers refer to similar parts, a battery package 20 containing batteries 22 is shown in FIG. 2. The package 20 is constructed from a stiff paperboard blank 24, as shown in FIG. 1. The blank 24 has an inside surface 26 shown uppermost in FIG. 1. The outside surface 28 of the blank, shown in FIG. 2, may have indicia printed thereon to inform the consumer about the contents and source of the package 20. The package 20 has the shape of a rectangular box 30 and contains an array of batteries 22. The array is one battery wide and eight batteries long. The batteries have positive ends 32 and negative ends 34, joined by cylindrical sides 36. The sides 36 of adjacent batteries 22 touch.

The blank 24 is folded to form the rectangular box 30, as shown in FIG. 2. The blank 24 has a top panel 38 and a bottom panel 40 joined by a back side panel 42. The top panel 38 defines the width of the box 30. The back side panel 42 together with the front side panel 44 defines the height of the box 30. An interior panel 46 is joined to the front side panel 44 by an overlapping bottom panel 48. The interior panel 46 in the folded box 30 shown in FIG. 2 is assembled to lie in spaced parallel relation to the back panel 42. This interior panel 46 and the front panel 44 closely engage the batteries 22. As shown in FIG. 2A, this spacing of the interior panel 46 from the back panel creates a gap 50 between the back panel 42 and the batteries 22 of approximately 1/10 to 1/5 of an inch with the electronic article surveillance sensor 52 positioned therein. This gap 50 allows an electronic article surveillance sensor 52 attached to the back side panel 42 to properly function.

The interior panel 46 is held in spaced relation to the back panel 42 by a glue tab 54 which attaches to a glue strip 56 along the back side of the top panel 38.

The box 30 is provided with a conventional punch out tab 58 which allows the removal of individual batteries from the package 20. Holes 60 along the top side panel 38 allow the consumer to confirm that the correct number of batteries is contained in the package and, unlike conventional boxes, the holes are offset towards the front side 44. The box 30 is closed at the ends 62, 64 by closure panels 66, 68 respectively.

The surveillance sensor 52 when in the activated condition triggers an alarm it the article to which the sensor is attached passes near detectors (not shown) placed at the exits of a store. In order to properly be detected the sensor must be spaced from any metal object. Thus batteries pose a problem with the placement of a surveillance sensor. An example of an effective package for a batteries including a sensor is disclosed in U.S. Pat. No. 5,586,657, the disclosure of which is incorporated by reference herein. The box 30 with the interior panel 46 allows the surveillance sensor 52 to be hidden within the box 30 and at the same time spaced from the metal surfaces 36 of the batteries. The sensor 52, depending on type, may function best if oriented with its long side 70 extending transverse to the vertical sides 36 of the batteries 22. The sensor 52 being thus disposed with its long axis perpendicular to the long axis of the batteries, will on average be further away from the metal of the cylindrical batteries than if it were disposed with its long axis parallel to the battery axes.

The box 30 has a height measured between the top panel 38, and a bottom panel 40. The top panel 38 and the bottom panel 40 are joined by the first side panel 42 and the second side panel 44, the width of the top panel and bottom panel defining the width between the first and second sides 42, 44. A plurality of identical batteries 22 are arranged adjacent to each other within the box 30 in a rectangular array having a width of one battery. The batteries are identically arranged so as to define the width of the array, the batteries being arranged so the sides of adjacent batteries touch. The top width and the box bottom width are approximately one-tenth to approximately one-fifth of an inch greater than the width of the battery array.

An exemplary sensor is the Ultra Max label manufactured by Sensormatic Electronics Corporation of 500 Northwest 12th Avenue, Deerfield Beach, Fla. 33442. The sensor 52 contains a thin film of magnetostrictive ferromagnetic material which is spaced from a second hard ferromagnetic metal plate. The magnetostrictive material is magnetically biased and thus armed by the hard ferromagnetic metal plate to mechanically resonate at a pre-selected frequency. Near each exit of a store an interrogation coil sweeps through a frequency range which includes the frequency at which the magnetic sensor will be induced to resonate, that is to vibrate. When the magnetostrictive material vibrates, a detector connected to a receiving coil detects a change in coupling between the interrogation coil and the receiving coil and sets off an alarm. In a preferred embodiment the sensor 52 is adhesively bonded to the side panel 42.

When a consumer takes a product to the check-out counter a de-activation device changes the magnetization of the second hard ferromagnetic metal plate which changes the frequency at which the magnetic sensor will be induced to resonate. Thus the product may be removed from the store without triggering the detector.

An alternative battery package 120 is shown in FIG. 3. The package is a rectangular box 130 which has a first side panel 142 and a second side panel 144. The package 120 is sized to hold AAA batteries 122. The top panel 138 overlies the positive terminals 132 of the batteries 122 and joins the two side panels 142, 144. A bottom panel 140 joins the first and second side panels 142, 144. The box 130 is constructed with a width sufficiently greater than the width of the batteries 122 so that space is available for a rectangular spacer of corrugated cardboard 141. The corrugated cardboard spacer 141 creates a gap between the batteries 122 and a sensor 152 which is adhesively attached to the first side 142.

The box 130 has the conventional features of a punch-out tab 158 for removal of batteries 122 from the box 130. Also the box 130 has holes 160 which are arrayed along the top of the box 130 to facilitate the consumer's inventorying the contents of the box 130. Unlike a conventional box the holes are not centered between the first and second sides 142, 144. Tests of sensor placement within test boxes has shown the importance, at least for some sensors, of employing corrugated cardboard as opposed to other materials which were tried and found to interfere with the proper functioning of the sensor. The width of the corrugated spacer 141 will typically be 1/10 to 1/5 of an inch in thickness. The corrugated spacer is positioned by the panels of the box 130, and need not be adhesively attached.

Figure 5:
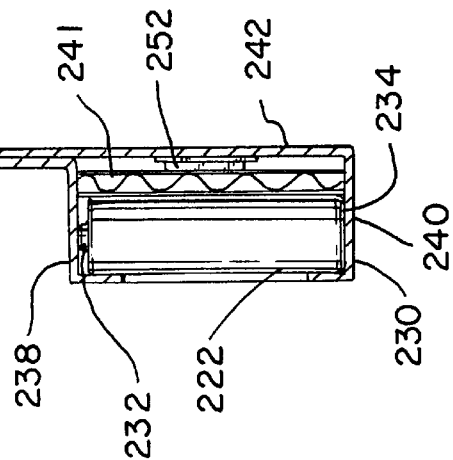
FIG. 5 is a cross-sectional view of the battery package of FIG. 4 taken along section line 5—5.
Figure 4:
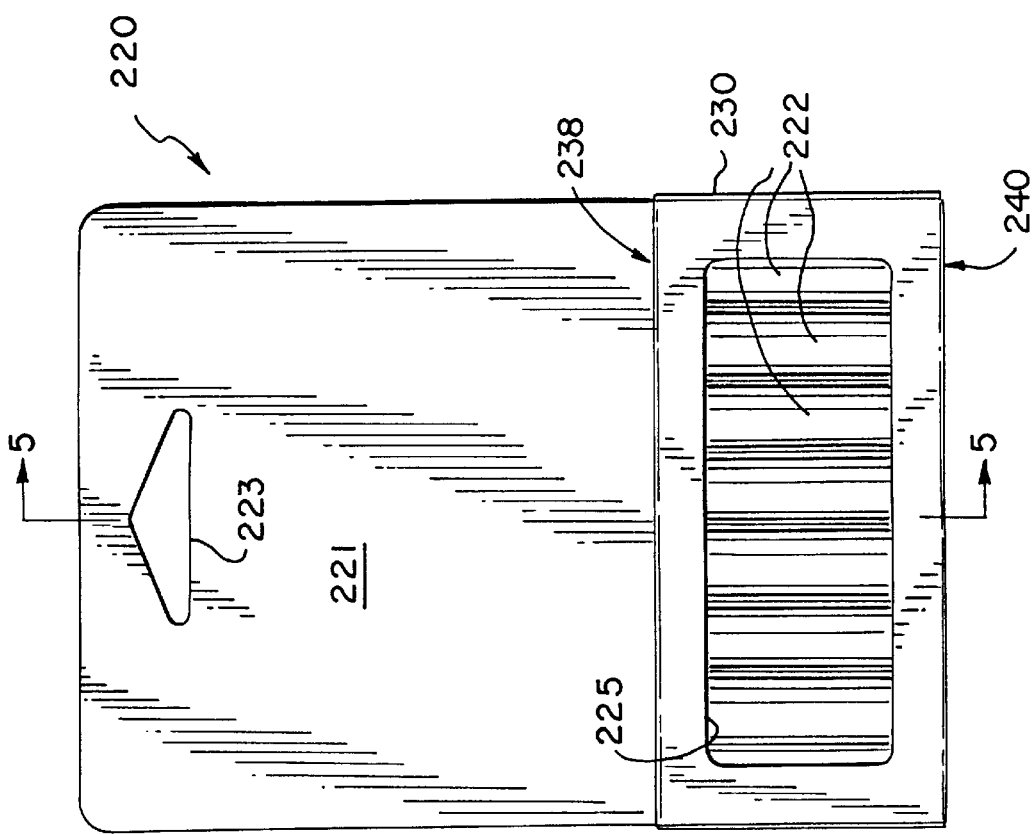
FIG. 4 is a front elevational view of a further alternative embodiment battery package of this invention.

Yet another battery package 220 is shown in FIGS. 4 and 5. This package 220 incorporates a display card 221 with a mounting hole 223. The package 220 has a window 225 through which batteries 222 can be viewed. A piece of corrugated cardboard 241 positioned behind the batteries 222 spaces the batteries from the back panel 242 of the box 230 which contains the batteries 222. Adhesively fastened to the inside of the back panel 242 of the box is a surveillance sensor 252. Over lying the positive ends 232 of the batteries 222 is a top panel 238, and underlying the negative ends 234 of the batteries 222 is a bottom panel 240. The width of the top panel 238 and the bottom panel 240 is greater then the width of the batteries 222 contained in the package 220. This greater width of the box 230 accommodates the cardboard insert 241 and the sensor 252.

Figure 6:
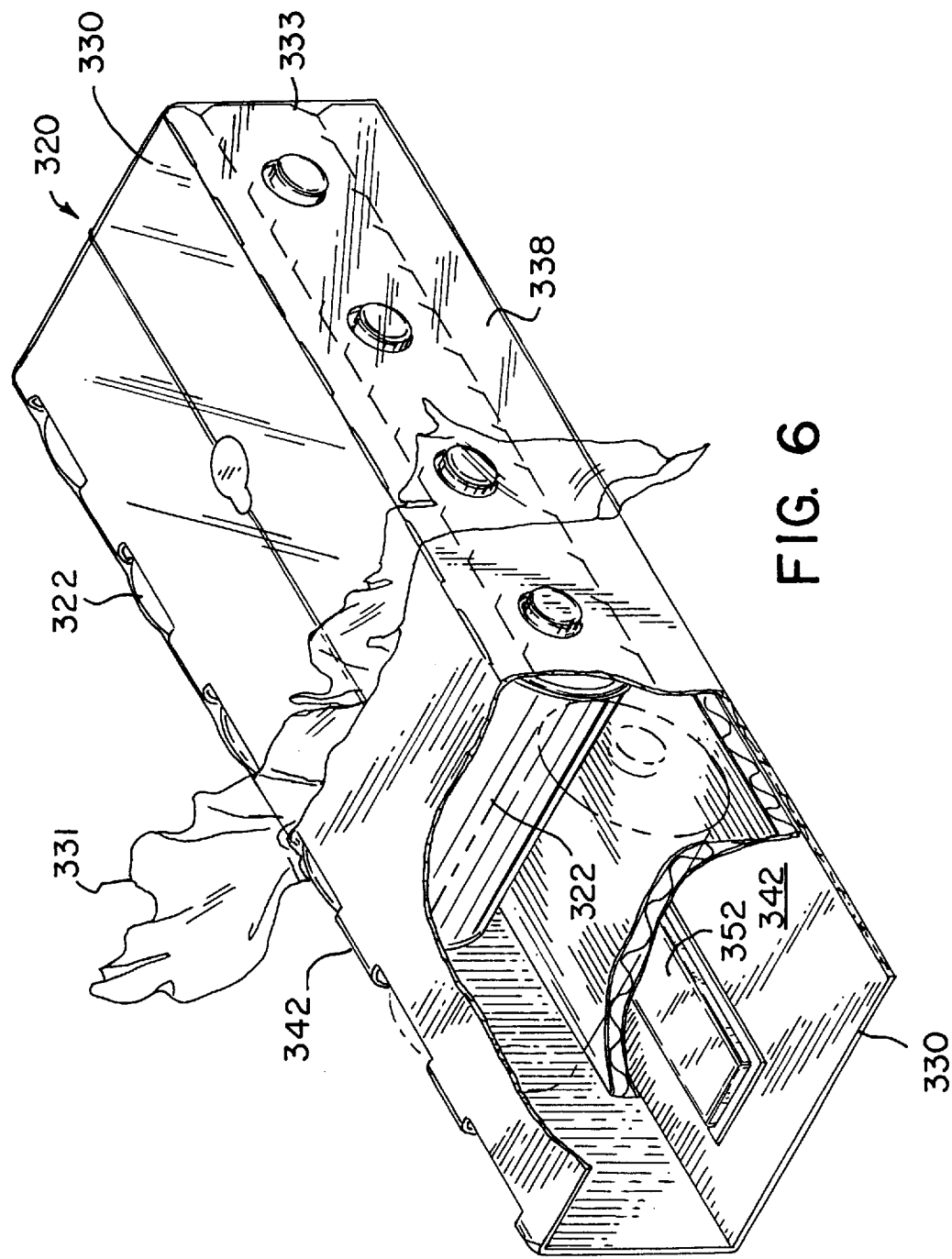
FIG. 6 is an isometric view of another alternative embodiment of the battery package of this invention.

Still another battery package 320 is shown in FIG. 6. The battery package is an opened ended rectangular tube 330. The tube 330 is wrapped with plastic film 331 and has a tear tab 333 along the top of the package for gaining access to the batteries 322. The top panel 338 and the bottom panel 340 are wider than the width of the batteries 322 so that a rectangular cardboard spacer 341 can be placed between the batteries and the back panel 342. A surveillance sensor 352 is adhesively attached to the back panel 342 and is spaced from the batteries by the cardboard spacer 341.

It should be understood that the invention embodiments disclosed in FIGS. 1–6 are similar in that the top and bottom of the battery box are wider than the width of the batteries contained within the box thus leaving room for a space created by a corrugated cardboard insert or an inner panel of the box. The space is created between the side of the box and the batteries and allows a surveillance sensor to be placed interior to the box and remain spaced from the batteries and their metal cases, this spacing allowing the sensor to properly function.

It should be understood that sensors of types other than the one illustrated and described could be used in the battery package 20.

It should also be understood that other battery types for example AA, AAA, AAAA, C, D, or 9-volt batteries, could be packaged in containers similar to the battery package 20, 120, 220 or 320.

It is understood that the invention is not limited to the particular construction and arrangement of parts herein illustrated and described, but embraces such modified forms thereof as come within the scope of the following claims.

We claim:

1. A consumer display package containing a plurality of batteries comprising:

a rectangular box having a height measured between a top panel and a bottom panel, the top panel and the bottom panel being joined by first and second side panels, wherein the first and second side panels are spaced apart from one another by the top panel and the bottom panel, the distance of the spacing of the first and second side panels being a first width which is the minimum distance between the first side panel and the second side panel;

a plurality of batteries, the batteries having tops and bottoms joined by sides, the batteries being arranged adjacent to each other within the rectangular box in a rectangular array having a maximum width of one battery, the batteries being identically arranged so as to define a width of the array, the batteries being arranged so the sides of adjacent batteries touch;

wherein the top panel and the bottom panel of the box overlie respectively, in spaced parallel relation the tops and the bottoms of the batteries, and wherein the box top panel and the box bottom panel are of the first width, the first width being approximately one tenth to approximately two tenths of an inch greater than the width of the battery array; and a means for spacing the array of batteries from the first side panel, the means for spacing closely engaging the array of batteries; and an electronic article surveillance sensor positioned between the means for spacing and the first side panel, thus providing shoplifting protection for a consumer display package containing a plurality of batteries wherein the package spaces the surveillance sensor from the batteries to allow the sensor to perform its function.

2. The consumer display package of claim 1 wherein the means for spacing the array of batteries is a corrugated paperboard spacer positioned between the batteries and the first side panel.

3. The consumer display package of claim 1 wherein the means for spacing the array of batteries is a box panel, extending between the top panel and the bottom panel of the box in spaced parallel relation to the first side panel of the box.

4. The consumer display package of claim 3 wherein the box is formed from a one-piece blank which is folded to form the top panel, the bottom panel, the first side panel, the second side panel, and the box panel.

5. The consumer display package of claim 1 wherein the surveillance sensor is affixed to the first side panel of the box.

6. The consumer display package of claim 1 further comprising a display card integrally formed with the box and extending upwardly from the box.

7. A consumer display package containing a plurality of batteries, the package comprising:

a rectangular box having a top panel spaced from a bottom panel a first distance defining a height, the top panel being connected to the bottom panel by a first side panel and a second side panel, the first side panel being spaced from the second side panel a second distance defining a width; the second distance being the width of the top panel and the bottom panel;

a plurality of batteries, the batteries having tops and bottoms joined by sides, wherein the batteries are arranged adjacent to each other within the rectangular box in a rectangular array having a width of one battery, the batteries being arranged to define an array width, the batteries being arranged so the sides of adjacent batteries touch;

wherein the top panel and the bottom panel of the box overlie respectively, in spaced parallel relation, the top and bottom of the batteries, the top panel and bottom panel width of the second distance being approximately one tenth to approximately one fifth of an inch greater that the array width; and an electronic article surveillance sensor mounted on the first side panel, thus providing shoplifting protection for a consumer display package containing a plurality of batteries wherein the package spaces the surveillance sensor from the batteries to allow the sensor to perform its function.

8. The consumer display package of claim 7 wherein the box is formed from a one-piece blank which is folded to form the top panel, the bottom panel, the first side panel, the second side panel and the box panel.

9. The consumer display package of claim 7 further comprising a display card integrally formed with the box.

10. A consumer display package containing a plurality of batteries comprising:

a rectangular box having a height measured between a top panel and a bottom panel, the top panel and the bottom panel being joined by a first side panel and a second side panel, the width of the top panel and the bottom panel defining a first width between the first side panel and the second side panel;

a plurality of batteries, the batteries having tops and bottoms joined by sides, the batteries being arranged adjacent to each other within the rectangular box in a rectangular array having a width of one battery, the batteries being identically arranged so as to define an array width, the batteries being arranged so the sides of adjacent batteries touch;

wherein the top panel and the bottom panel of the box overlies, respectively, in spaced parallel relation the tops and the bottoms of the batteries, the box top panel and box bottom panel first width being approximately one tenth to approximately one fifth of an inch greater than the array width;

an electronic article surveillance sensor mounted on the first side panel facing toward the array of batteries;

a corrugated spacer positioned between the array of batteries and the first side panel, so that the spacer is interposed between the array of batteries and the sensor, preventing adjacent contact between the batteries and the sensor, thus providing shoplifting protection for a consumer display package containing a plurality of batteries wherein the corrugated cardboard spacer spaces the surveillance sensor from the batteries to allow the sensor to perform its function.

11. The consumer display package of claim 10 wherein the box is formed from a one-piece blank which is folded to form the top panel, the bottom panel, the first side panel, the second side panel, and a display card which is integrally formed with the blank.

* * * * *